United States Patent
Huang et al.

(10) Patent No.: US 8,728,995 B2
(45) Date of Patent: May 20, 2014

(54) PROCESS FOR THE PREPARATION OF POLYALKENYL SUCCINIC ANHYDRIDES

(75) Inventors: Chente Huang, Midlothian, VA (US); John T. Loper, Richmond, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 13/009,351

(22) Filed: Jan. 19, 2011

(65) Prior Publication Data

US 2011/0111994 A1    May 12, 2011

Related U.S. Application Data

(63) Continuation-in-part of application No. 11/670,256, filed on Feb. 1, 2007, now Pat. No. 7,897,696.

(51) Int. Cl.

| | |
|---|---|
| *C08F 8/22* | (2006.01) |
| *C08F 8/32* | (2006.01) |
| *C08F 110/10* | (2006.01) |
| *C08F 8/46* | (2006.01) |
| *C10M 149/02* | (2006.01) |

(52) U.S. Cl.
USPC ........... 508/287; 508/232; 508/235; 508/534; 525/333.7; 525/356; 525/357; 525/375; 525/379; 525/381; 525/382; 525/386; 528/486

(58) Field of Classification Search
USPC ............... 508/232, 235, 287, 534; 525/333.7, 525/356, 357, 375, 379, 381, 382, 386; 528/486
See application file for complete search history.

(56) References Cited

U.S. PATENT DOCUMENTS

| | | | |
|---|---|---|---|
| 3,215,707 A | 11/1965 | Rense | |
| 3,231,587 A | 1/1966 | Rense | |
| 3,912,764 A | 10/1975 | Palmer, Jr. | |
| 4,110,349 A | 8/1978 | Cohen | |
| 4,152,499 A | 5/1979 | Boerzel et al. | |
| 4,234,435 A | 11/1980 | Meinhardt et al. | |
| 5,071,919 A | 12/1991 | DeGonia et al. | |
| 5,112,507 A | 5/1992 | Harrison | |
| 5,137,980 A | 8/1992 | DeGonia et al. | |
| 5,616,153 A | 4/1997 | Mike et al. | |
| 5,625,004 A | 4/1997 | Harrison et al. | |
| 5,644,001 A | 7/1997 | Blackborow et al. | |
| 5,672,266 A | 9/1997 | Sivik et al. | |
| 5,739,355 A | 4/1998 | Gateau et al. | |
| 5,916,825 A | 6/1999 | Cherpeck | |
| 6,107,450 A * | 8/2000 | Harrison et al. | ........... 528/329.1 |
| 6,156,850 A | 12/2000 | Harrison et al. | |
| 6,165,235 A | 12/2000 | Kolp et al. | |
| 6,562,904 B2 | 5/2003 | Barini et al. | |
| 6,867,171 B2 | 3/2005 | Harrison et al. | |
| 6,933,351 B2 | 8/2005 | Michaud | |
| 7,091,306 B2 | 8/2006 | Heddadj et al. | |
| 2005/0202981 A1 | 9/2005 | Eveland et al. | |

FOREIGN PATENT DOCUMENTS

| | | | |
|---|---|---|---|
| EP | 0355895 A2 | | 2/1990 |
| EP | 355895 A2 | * | 2/1990 |
| EP | 1489105 A2 | | 12/2004 |
| EP | 1489107 A2 | | 12/2004 |

OTHER PUBLICATIONS

Polyisobutene "Glissopal", BASF Product Sheet; retrieved Oct. 2013, http://www.performancechemicals.basf.com/ev/internet/polyisobutene/en/content/EV3/polyisobutene/glissopal.*

* cited by examiner

*Primary Examiner* — Roberto Rabago
(74) *Attorney, Agent, or Firm* — Luedeka Neely Group, P.C.

(57) ABSTRACT

A polyalkenyl succinic anhydride is prepared with low amounts of resinous or chlorinated byproducts in a two-step process whereby a polyalkene is first reacted with an unsaturated organic acid in a thermal ene reaction, followed with exposure to a gaseous halogen in presence of an additional amount of the unsaturated organic acidic reagent. The foregoing process produces a polyisobutenyl succinic anhydride having a high ratio of succinic anhydride functional groups to polyisobutenyl backbone groups. Such a polyisobutenyl succinic anhydride is particular suitable for the production of oil-soluble hydrocarbyl succinimides that have good dispersant properties when added to lubricating oil compositions.

10 Claims, No Drawings

PROCESS FOR THE PREPARATION OF POLYALKENYL SUCCINIC ANHYDRIDES

RELATED APPLICATION

This application is a continuation-in-part of U.S. Pat. No. 7,897,696, issued Mar. 1, 2011 application Ser. No. 11/670,256, filed Feb. 1, 2007.

TECHNICAL FIELD

The present disclosure relates to the chemical synthesis of polyalkenyl succinic anhydrides suitable as intermediate compounds for the preparation of petroleum product additives, as well as petroleum product additives that may be made from such intermediate compounds.

BACKGROUND AND SUMMARY

Polyalkenyl succinic anhydrides are widely used in the petroleum product industry as precursor compounds for the production of hydrocarbyl polyalkenyl succinimides. Hydrocarbyl polyalkenyl succinimides may be used as detergents in fuel mixtures to reduce engine deposits and as dispersants in lubricating oil compositions to aid in the suspension of particulate matter, additionally having the property of modifying the fluidity of a lubricating oil composition. An example of a polyalkenyl succinic anhydride suitable as such a precursor compound for making lubricating oil additives is polyisobutenyl succinic anhydride ("PIBSA"). PIBSA is usually produced by following either of two conventional processes. For the purposes of simplicity, reference will be made to the process for PIBSA, however the disclosure is intended to relate to processes for the production of all hydrocarbyl polyalkenyl/acid compounds not just PIBSA.

The first process consists of a direct thermal condensation reaction between maleic anhydride and polyisobutene ("PIB") and is often referred in the art as the "thermal ene" reaction. In the thermal ene reaction, a carbon-carbon bond is formed between an alpha-carbon on the unsaturated organic acidic reagent and a vinylic carbon at a terminus of the polyalkene. Sustained exposure to elevated temperatures above 150° C. is required to obtain good reaction yields, usually for a time period ranging from about 1 to about 48 hours. However, high reaction temperatures typically lead to the formation of a sedimentous resin which is believed to be due to the polymerization and/or decomposition of maleic anhydride. The formation of such insoluble resin or sediment in significant amounts requires a filtration stage before the PIBSA can be used as an additive or as an intermediate in the preparation of other products such as hydrocarbyl succinimides. Furthermore, according to U.S. Pat. No. 5,644,001, undesirable resins in the product introduce not only a significant discrepancy between the real and apparent succinylation in the maleinised product (due to the presence of resinified and/or unreacted maleic anhydride) but also adversely affect the detergency properties of such additives.

In the second type of process, chlorination of the PIB is first carried out, followed by the condensation of the chlorinated PIB with maleic anhydride. This process can be carried out at lower temperature than the thermal ene reaction process, with high yield and without the formation of substantial amounts of sediment. However, the PIBSA obtained with this process contains residual chlorine. Environmental concerns related to chlorine-containing materials and the potential for formation of hazardous byproducts, such as dioxins, that may arise under the conditions prevalent in an internal combustion engine make the use of the second process undesirable. Furthermore, chlorine is also known to be a poison for the catalysts used for exhaust gas treatment systems, i.e. as in catalytic converters.

The aforementioned conventional methods for the preparation of PIBSA tend to involve side reactions that produce tars, resins, or halogenated byproducts which must be separated from the PIBSA before further processing occurs. Undesirable resinous byproducts and reduced product succination are more prevalent when the ene reaction is conducted at elevated temperatures and the polyalkenyl compounds have number average molecular weights above about 1200. Accordingly, there remains a need for an improved synthesis process for relatively highly succinated polyalkenyl succinic anhydrides of relatively high number average molecular weight that does not produce undesirable byproducts during the course of the reaction and does not require extreme reaction conditions such as prolonged heating, elevated pressure, or the presence of a strong acid.

In accordance with a first aspect, an exemplary embodiment of the present disclosure provides a process for making a polyalkenyl succinic anhydride, such as PIBSA. A mixture of highly reactive PIB and maleic anhydride are heated until at least about 50 weight % of the PIB is converted to PIBSA. An additional amount of maleic anhydride is added to the mixture which is subsequently contacted with chlorine gas to convert at least some of the unreacted PIB to PIBSA under conditions sufficient to inhibit the formation of undesirable resinous or chlorinated byproducts.

In accordance with a second aspect, another embodiment of the present disclosure provides a hydrocarbyl succinimide made from a PIBSA produced by the aforementioned process.

In accordance with a third aspect, a further embodiment of the present disclosure provides a lubricant component comprising a hydrocarbyl succinimide made from a PIBSA produced by the aforementioned process.

As described herein the disclosure provides a two-step process for the preparation of polyalkenyl succinic anhydrides, such as PIBSA, with the resultant product having a relatively high ratio of succinic functional groups to polyalkenyl functional groups, and a relatively low level of undesirable contaminants. This novel process also allows PIBSA with a number average molecular weight greater than about 1000, and up to about 3000, to be synthesized. Higher number average molecular weight and a higher ratio of succinic groups to polyalkenyl groups in a compound such as PIBSA increase the dispersant performance of a dispersant made from the PIBSA when the dispersant is combined in a lubricating oil mixture. Accordingly, a smaller amount of dispersant additive may be used per quantity of lubricating oil composition, thereby reducing the cost of production of the lubricant composition as well as reducing the environmental impact.

DETAILED DESCRIPTION OF THE EXEMPLARY EMBODIMENTS

The production of an oil-soluble hydrocarbyl succinimide suitable for use as a dispersant lubricant additive begins with the production of a polyalkenyl succinic anhydride. In the present disclosure, the polyalkenyl succinic anhydride is synthesized in a two stage reaction process capable of producing a product having both a relatively high number average molecular weight and a relatively high ratio of succinic to polyalkenyl groups. The first stage of the reaction process employs a thermal ene reaction between a polyalkene compound and an unsaturated organic acidic reagent, until about 50 weight % of the polyalkene has been derivatized. Subsequently, an additional amount of the unsaturated organic acidic reagent and a small amount of a halogen gas are added to the reaction until at least some of the underivatized polyalkene has also been converted to a polyalkenyl succinic anhydride in a second stage of the reaction process.

For such purposes, PIB is suitably employed as the polyalkene compound. It has been found that PIB having a greater than about 50 mole %, such as 60 mole %, and desirably about 75 mole % content of terminal double bonds is particularly suitable for this reaction. Such PIB is also referred to as highly reactive PIB ("HR-PIB"). HR-PIB having a number average molecular weight ranging from about 800 to about 5000 is particularly suitable for use in embodiments of the present disclosure.

HR-PIB having a number average molecular weight ranging from about 1000 to about 3000 is particularly suitable for an exemplary embodiment of the present disclosure. Such HR-PIB is commercially available, or can be synthesized by the polymerization of isobutene in the presence of a non-chlorinated catalyst such as boron trifluoride, as described in U.S. Pat. No. 4,152,499 to Boerzel, et al. and U.S. Pat. No. 5,739,355 to Gateau, et al. When used in the aforementioned thermal ene reaction, HR-PIB may lead to higher conversion rates in the reaction, as well as lower amounts of sediment formation, due to increased reactivity.

The unsaturated organic acidic reagent of the disclosed process refers to an unsaturated substituted or non-substituted carboxylic acid reagent, for example maleic or fumaric reactants of the general formula:

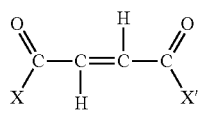

wherein X and X' are the same or different, provided that at least one of X and X' is a group that is capable of reacting to esterify alcohols, forming amides or amine salts with ammonia or amines, forming metal salts with reactive metals or basically reacting metal compounds, or otherwise functioning as an acylating agent. Typically, X and/or X' is —OH, —O-hydrocarbyl, —NH$_2$, and taken together X and X' can be —O— so as to form an anhydride. Preferably, X and X' are such that both carboxylic functions can enter into acylation reactions.

Maleic anhydride is a particularly suitable unsaturated acidic reactant. Other suitable unsaturated acidic reactants include electron-deficient olefins such as monophenyl maleic anhydride; monomethyl maleic anhydride, dimethyl maleic anhydride, N-phenyl maleimide and other substituted maleimides; isomaleimides; fumaric acid, maleic acid, alkyl hydrogen maleates and fumarates, dialkyl fumarates and maleates, fumaronilic acids and maleanic acids; and maleonitrile and fumaronitrile.

The halogen gas required for the second stage of the process may be a gas selected from the group consisting of fluorine, chlorine, bromine, or iodine. In an exemplary embodiment, chlorine gas is the preferred halogen gas employed. The amount of halogen gas used in the second stage of the process may vary within relatively wide limits. However, it is desirable to use a molar ratio range of about 0.25 moles to about 1.5 moles of halogen gas per mole of HR-PIB or acidic reactant.

In embodiments of the present disclosure, a trace amount of a Lewis acid may be used during the first stage of the process. The Lewis acid does not act as a catalyst for the thermal ene reaction, however it does act to inhibit the self-polymerization of the unsaturated organic acidic reagent into an insoluble resin, as described in U.S. Pat. No. 5,071,919 to DeGonia et al. Lewis acids suitable for use in the present disclosure include aluminum chloride, boron trifluoride, iron (III) chloride, and analogs thereof. A trace amount, as required by the present disclosure, may be a concentration of the Lewis acid ranging from about 20 ppm to about 200 ppm by weight based on a total weight of components in the first stage of the process.

In the first stage of the presently disclosed process a mixture of HR-PIB, maleic anhydride in a mole ratio of about 1 mole of HR-PIB to about 2 moles of maleic anhydride, and a trace amount of aluminum chloride are exposed to an elevated temperature ranging from about 150° C. to about 250° C. for a duration of time ranging from about 1 hour to about 48 hours, until about 50 weight % of the HR-PIB has been derivatized with the maleic anhydride.

In the second stage of the process, an additional amount of maleic anhydride is combined with the mixture. The amount of maleic anhydride combined with the mixture in the second stage may range from about 0% to about 50% of the total amount of maleic anhydride used in the process. The additional amount of maleic anhydride is combined with the mixture after about 50 weight % of the HR-PIB has been derivatized. During the second stage of the process, chlorine gas in a molar range from about 0.25 moles to about 1.5 moles per mole of HR-PIB in the mixture is bubbled through the mixture, and HCl gas is devolved and removed from the mixture as it is formed.

The second stage of the process is continued until at least some of the unreacted HR-PIB is also derivatized with the maleic anhydride. Such a process has been shown to provide a PIBSA having a succinic anhydride ("SA") to PIB molar ratio up to at least about 1.5. As demonstrated in Example 5, such an SA to PIB molar ratio is able to be achieved even when the HR-PIB used in the process has a number average molecular weight greater than about 1600.

In an embodiment of the invention, the PIBSA compound may have a SA/PIB mole ratio of greater than 1.5:1 to about 2:1.

A PIBSA produced by the aforementioned process is suitable for conversion to an oil-soluble succinimide particularly useful as a dispersant additive for lubricating oil compositions. Conversion of PIBSA to a succinimide is well known in the art and may be accomplished through the reaction of a polyamine with the PIBSA, wherein the polyamine has at least one basic nitrogen in the compound, as described in U.S. Pat. No. 3,215,707 and U.S. Pat. No. 4,234,435. Suitable polyamines may have at least three nitrogen atoms and about 4 to 20 carbon atoms. One or more oxygen atoms may also be present in the polyamine.

A particularly suitable group of polyamines for use in the present disclosure are polyalkylene polyamines, including alkylene diamines. Such polyalkylene polyamines may contain from about 2 to about 12 nitrogen atoms and from about 2 to about 24 carbon atoms. Preferably, the alkylene groups of such polyalkylene polyamines may contain from about 2 to about 6 carbon atoms, more preferably from about 2 to about 4 carbon atoms.

Particularly suitable polyalkylene polyamines are those having the formula: H$_2$N—(R$_1$NH)$_a$—H wherein R$_1$ is a straight- or branched-chain alkylene group having from about 2 to about 6 carbon atoms, preferably about 2 to about 4 carbon atoms, most preferably about 2 carbon atoms, i.e., ethylene (—$CH_2CH_2$—); and a is an integer from 1 to about 10, preferably 1 to about 4, and more preferably about 3.

Examples of suitable polyalkylene polyamines include, but are not limited to, ethylenediamine, propylenediamine, isopropylenediamine, butylenediamine, pentylenediamine, hexylenediamine, diethylenetriamine, dipropylenetriamine, dimethylaminopropylamine, diisopropylenetriamine, dibutylenetriamine, di-sec-butylenetriamine, triethylenetetraamine, tripropylenetetraamine, triisobutylenetetraamine, tetraethylenepentamine, pentaethylenehexamine, dimethylaminopropylamine, and mixtures thereof.

Particularly suitable polyalkylene polyamines are ethylenediamine, diethylenetriamine, triethylenetetraamine, and tetraethylenepentamine. Most suitable are ethylenediamine, diethylenetriamine, and triethylenetetraamine.

Many of the polyamines suitable for use in the present disclosure are commercially available and others may be prepared by methods which are well known in the art. For example, methods for preparing amines and their reactions are detailed in Sidgewick's "The Organic Chemistry of Nitrogen", Clarendon Press, Oxford, 1966; Noller's "Chemistry of Organic Compounds", Saunders, Philadelphia, 2nd Ed., 1957; and Kirk-Othmer's "Encyclopedia of Chemical Technology", 2nd Ed., especially Volume 2, pp. 99-116.

The hydrocarbyl succinimide produced from the PIBSA made by the aforementioned process has a higher number average molecular weight and a higher ratio of succinimide functional linkages to polyalkene backbone groups than other hydrocarbyl succinimides produced from PIBSA made by conventional processes. Accordingly, the inclusion of a presently disclosed hydrocarbyl succinimide into a lubricant composition may provide a lubricant with improved dispersant characteristics as compared to the dispersant characteristics of lubricant compositions containing hydrocarbyl succinimides having lower SA to PIB ratios or lower number average molecular weights. In an embodiment of the invention, the lubricant composition comprises a major amount of base oil, and a minor amount of the presently disclosed hydrocarbyl succinimide.

EXAMPLES

The following non-limiting examples comparatively illustrate one or more advantages of the presently disclosed process over conventional processes in the production of PIBSA having a high SA to PIB ratio. In the following examples, Examples 3 and 5 are made according to the two step process described herein and provide PIBSA products from HR-PIB having a relatively high SA to PIB molar ratio in relatively high yield. Examples 1 and 6 illustrate products made using non-highly reactive PIB (non-HR-PIB). Examples 2 and 4 were made by a one-step thermal ene reaction using HR-PIB.

| | | | PIBSA Product | | |
|---|---|---|---|---|---|
| Example # | PIB | PIB ($M_n$) | Acid # (Mg KOH/g) | Activity (wt. %) | SA:PIB Molar ratio |
| 1 | non-HR-PIB | 1250 | 0.672 | 68.1% | 1.37 |
| 2 | HR-PIB | 1250 | 0.946 | 88.1% | 1.5 |
| 3 | HR-PIB | 1300 | 1.070 | 92.0% | 1.8 |
| 4 | HR-PIB | 2100 | 0.552 | 80.1% | 1.5 |
| 5 | HR-PIB | 2100 | 0.732 | 91.5% | 1.8 |
| 6 | non-HR-PIB | 2100 | 0.621 | 89.1% | 1.6 |

In the first example, a conventional (i.e. non-highly reactive) PIB having a number average molecular weight of about 1250 was reacted using the presently disclosed two stage process for the production of PIBSA, yielding a product having a SA:PIB of 1.37 with an activity of 68.1 wt. %.

In Example 2, an HR-PIB having a number average molecular weight of about 1250 was reacted using only the thermal ene process for the production of PIBSA, yielding a product having a SA:PIB of 1.5 with an activity of 88.1 wt. %.

In Example 3, an HR-PIB having a number average molecular weight of about 1300 was reacted using the presently disclosed two stage process for the production of PIBSA, yielding a product having a SA:PIB of 1.8 with an activity of 92.0 wt. %.

In Example 4, an HR-PIB having a number average molecular weight of about 2100 was reacted using only the thermal ene process for the production of PIBSA, yielding a product having a SA:PIB of 1.5 with an activity of 80.1 wt. %.

In Example 5, an HR-PIB having a number average molecular weight of about 2100 was reacted using the presently disclosed two stage process for the production of PIBSA, yielding a product having a SA:PIB of 1.8 with an activity of 91.5 wt. %.

In Example 6, a conventional PIB having a number average molecular weight of about 2100 was reacted using a chlorination step followed by a thermal reaction yielding a PIBSA having a SA:PIB of 1.6 with an activity of 89.1 wt. %.

As demonstrated by the foregoing example, a PIBSA made by the disclosed two step process, in the absence of filtration, using an HR-PIB provides products having SA:PIB ratios above about 1.5 and an activity of greater than 90 wt. % to about 92 wt. % which is a higher activity than provided by thermal conventional processes. Another advantage of the disclosed process is that higher molecular weight polyalkenyl compounds may be used without an increase in undesirable byproducts.

At numerous places throughout this specification, reference has been made to a number of U.S. patents and publications. All such cited documents are expressly incorporated in full into this disclosure as if fully set forth herein.

The foregoing disclosed embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

What is claimed is:

1. A hydrocarbyl succinimide, comprising a reaction product of (A) a polyalkenyl succinic acid or anhydride compound derived from a polyalkene compound having a number average molecular weight ranging from greater than about 1300 to about 3000 and having greater than about 50 mol % terminal double bond content and an unsaturated acidic reagent, wherein the polyalkenyl compound and acidic reagent are reacted in a mole ratio of acidic reagent to polyalkene of greater than about 1.5:1 to about 2:1 in the absence of sulfonic acid, wherein the succinic acid or anhydride compound, as made, has an activity of greater than 90 wt. % to about 92 wt. % and is devoid of insoluble resin or sediment and (B) a polyamine having at least one basic nitrogen atom.

2. A lubricant composition comprising a major amount of base oil, and a minor amount of the hydrocarbyl succinimide of claim 1.

3. A lubricant additive dispersant comprising:
a reaction product of a polyamine having at least one basic nitrogen atom and a polyalkenyl succinic acid or anhydride derived from a polyalkene compound having a number average molecular weight ranging from greater than about 1300 to about 3000 and having greater than 50 mol % terminal double bond content and an unsaturated acidic reagent wherein the polyalkene compound and acidic reagent are reacted in a mole ratio of acidic reagent to polyalkene of greater than about 1.5:1 to about 2:1 in the absence of sulfonic acid, wherein the succinic acid or anhydride compound, as made, has an activity of greater than 90 wt. % to about 92 wt. % and is devoid of insoluble resin or sediment prior to amination.

4. The dispersant of claim 3 wherein the polyakenyl succinic acid or anhydride is made by a process comprising the steps of:
heating a mixture of the polyalkene compound and the unsaturated acidic reagent to a thermal ene reaction temperature until about 50 weight percent of the polyalkene compound has reacted; and
subsequently, contacting the mixture from the heating step with an additional amount of the unsaturated acidic reagent in the presence of a halogen gas to convert at least a portion of unreacted polyalkene compound in the mixture from the heating step to the polyalkenyl succinic acid or anhydride compound.

5. The dispersant of claim 4, wherein the temperature ranges from about 150° C. to about 250° C.

6. The dispersant of claim 4, wherein the mixture from the heating step comprises unreacted polyalkene, unreacted unsaturated acidic reagent, and a polyalkenyl derivative of the unsaturated acidic reagent.

7. The dispersant of claim 4, wherein the step of heating comprises heating the mixture in the heating step in the presence of a Lewis acid selected from the group consisting of aluminum chloride, boron trifluoride, and iron (III) chloride at a concentration ranging from about 20 ppm to about 200 ppm by weight based on a total weight of the mixture in the heating step.

8. The dispersant of claim 4, wherein the halogen gas is present in a molar range from about 0.25 moles to about 1.5 moles per mole of polyalkene compound.

9. The hydrocarbyl succinimide of claim 1, wherein the reaction product has a succinic acid to polyalkenyl group molar ratio of 1.8 or greater.

10. The lubricant additive dispersant of claim 3, wherein the reaction product has a succinic acid to polyalkenyl group molar ratio of 1.8 or greater.

\* \* \* \* \*